United States Patent [19]

Marshall et al.

[11] Patent Number: 4,480,657

[45] Date of Patent: Nov. 6, 1984

[54] VACUUM LINE CONTROL VALVES

[75] Inventors: Barry R. Marshall, Minster Lovell; Paul A. Knight, Abingdon, both of England

[73] Assignee: Ambic Equipment Limited, Minster Lovell, England

[21] Appl. No.: 311,866

[22] Filed: Oct. 15, 1981

[30] Foreign Application Priority Data

Nov. 5, 1980 [GB] United Kingdom ................. 8035575
Jan. 2, 1981 [GB] United Kingdom ................. 8100085

[51] Int. Cl.³ ........................................... F16K 31/126
[52] U.S. Cl. ................................................. 137/103
[58] Field of Search ........................... 137/103, 624.14

[56] References Cited

U.S. PATENT DOCUMENTS

| 1,501,408 | 7/1924 | Lindstrom | 137/103 |
| 2,292,401 | 8/1942 | Orre | 137/103 |
| 2,359,508 | 10/1944 | Bergstedt | 137/103 |
| 2,379,483 | 7/1945 | Hapgood | 137/103 |
| 2,664,095 | 12/1953 | Magni | 137/103 |

FOREIGN PATENT DOCUMENTS 1002759 3/1952 France ............................ 137/103

Primary Examiner—Robert G. Nilson
Attorney, Agent, or Firm—Larson and Taylor

[57] ABSTRACT

A vacuum line control valve having a single vacuum input port and a pair of output ports to which vacuum is supplied alternately, each output port being vented to atmosphere when not at vacuum pressure. A reciprocating valve control member is carried by a resilient diaphragm which separates two internal chambers. A first valve control setting corresponds to the initial, rest position of the diaphragm. Differential pressures in the chambers first displace the diaphragm to the second valve control setting and then return it to the first. Frequency of alternation is determined by a bleed aperture between one output port and one chamber.

7 Claims, 3 Drawing Figures

VACUUM LINE CONTROL VALVES

DESCRIPTION OF THE INVENTION

This invention relates to vacuum line control valves.

The object of the invention is to provide a control valve with a vacuum line input and two line outputs, which is able continuously and automatically to apply the vacuum of the input line first to one output line and then to the other output line in alternate succession.

One application of the invention is in a milking parlour, where a vacuum line, used primarily for operating mechanical milking machines, is available. The control valve of the invention then provides for a pair of differential vacuum lines capable of powering auxiliary apparatus.

In a particular example, the pair of differential vacuum lines power the first stage of a two-stage diaphragm pressure pump. The second stage provides a pressure head of disinfectant fluid.

Accordingly, the present invention provides a vacuum line control valve for a single vacuum input line, for providing vacuum output alternately in a pair of differential output vacuum lines, comprising a hollow body divided into two chambers by a laterally displaceable elastic diaphragm, a vacuum input port, first and second differential output vacuum ports, first and second controllable vents to atmosphere connected respectively with said first and second output ports and an internal communicating channel and valve structure, said valve structure being operable by movement of said diaphragm for connecting said vacuum input port by way of said internal communicating channel alternately to the first output vacuum port, while venting the second output port to atmosphere at said second controllable vent, and to the second output vacuum port, while venting the first output port to atmosphere at said first controllable vent, in a continuous manner so long as a vacuum input is applied to said input port.

One embodiment of the invention will now be described, by way of example, with reference to the accompanying drawings.

SHORT DESCRIPTION OF THE DRAWINGS

DESCRIPTION OF SPECIFIC EMBODIMENT

Figure 1:
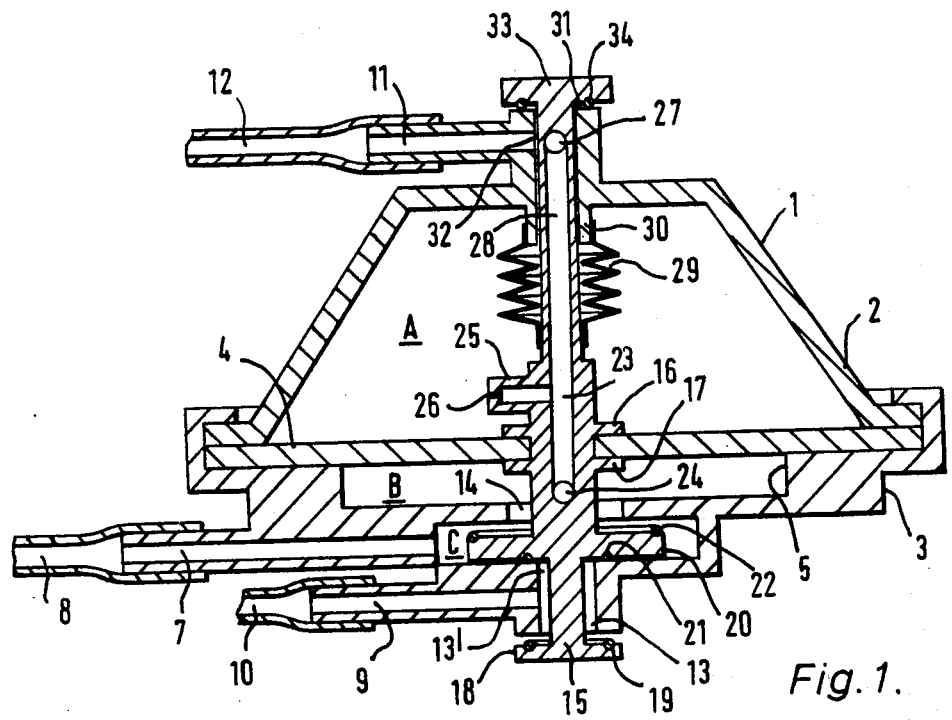
FIG. 1 shows a diagrammatic cross-sectional representation of a vacuum line control valve according to the invention, showing the internal diaphragm and valve-closure member in one operative position.
Figure 2:
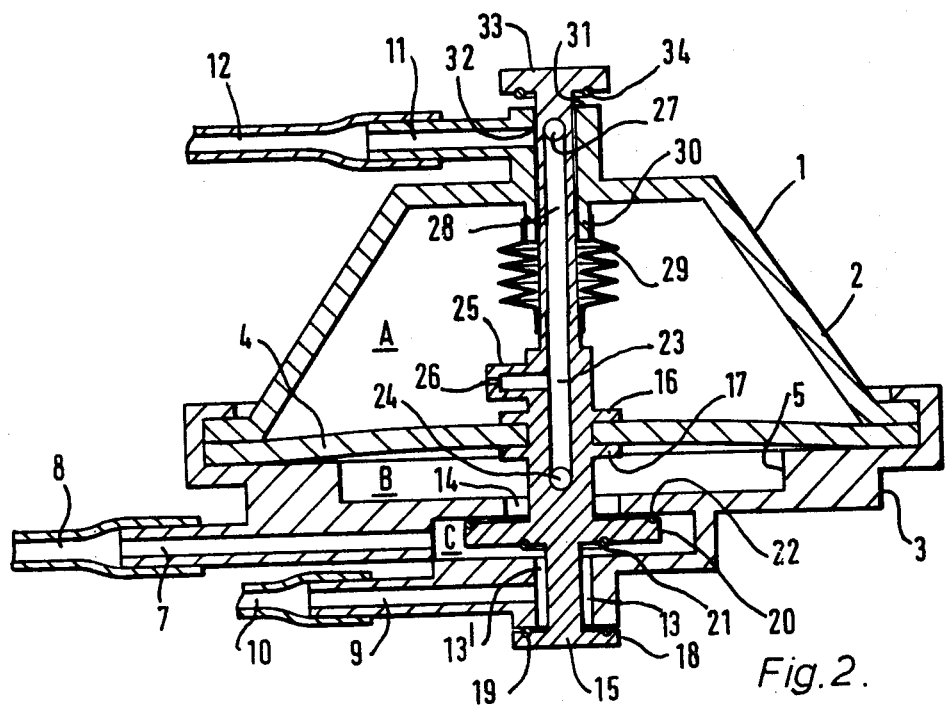
FIG. 2 shows a view similar to that of FIG. 1 with the diaphragm and valve-closure member in the alternative operative position.

FIGS. 1 and 2 of the accompanying drawings show a vacuum line control valve comprising a hollow body 1 formed from an upper moulded part 2, as viewed in FIGS. 1 and 2, and a lower moulded part 3 assembled together with a laterally-displaceable, elastic, circular diaphragm 4 sealed between the two parts 2 and 3. The diaphragm 4 thus divides the body 1 into an upper chamber A and a lower chamber B.

Moulded integrally with the lower body part 3 is a vacuum input port 7, which is connected to a vacuum supply line 8, and a first output vacuum port 9, which is connected to a first output line 10. Moulded integrally with the upper body part 2 is a second output vacuum port 11, which is connected to a second output line 12.

Also moulded integrally with the lower body part 3 is a passageway and valve seating structure which provides passageways between the output port 9 and a valve-controlled first vent to atmosphere at 13, a valve-controlled passageway 13' between the input port 7 and the output port 9, and a valve-controlled passageway 14 between the input port 7 and the chamber B.

Internally of the body 1 and attached at the centre of the diaphragm 4 is a reciprocating valve-closure member 15. This member is attached to the diaphragm 4 by opposed flanges 16 and 17. The member 15 is an assembly of component parts, not separately indicated in the drawings, which extends through the body 1 and provides a first vent closure flange 18 carrying a ring seal 19 on its upper face. Below the passageway 14, in a small chamber C directly and permanently connected to the vacuum inlet port 7, is a valve closure flange 20 carrying a ring seal 21 on its lower face and a ring seal 22 on its upper face.

The part of the valve-closure member 15 which passes through the chamber A is hollow to provide an internal passageway 23 which opens at its lower end into the chamber B by way of an orifice 24. Near the middle of member 15, the passageway 23 extends into a hollow stub 25 which communicates with the chamber A through a bleed orifice 26.

The output port 11 extends by way of an orifice 27 into a passageway 28 near the top of member 15. A bellows connector 29 seals the stem of member 15 with a stub 30 formed with the body 1 internally of chamber A. Passageway 23 is thereby sealed from communication with chamber A, except by way of the bleed orifice 26. Passageway 23 is connected by orifice 24 with chamber B.

It will be particularly noted that the outer wall 5 of chamber B is of less diameter than the base diameter of the body part 2. Hence, when diaphragm 4 is in the position shown in FIG. 1, the area of diaphragm 4 which bounds chamber B is considerably less than the area of diaphragm 4 which bounds chamber A.

Figure 3:
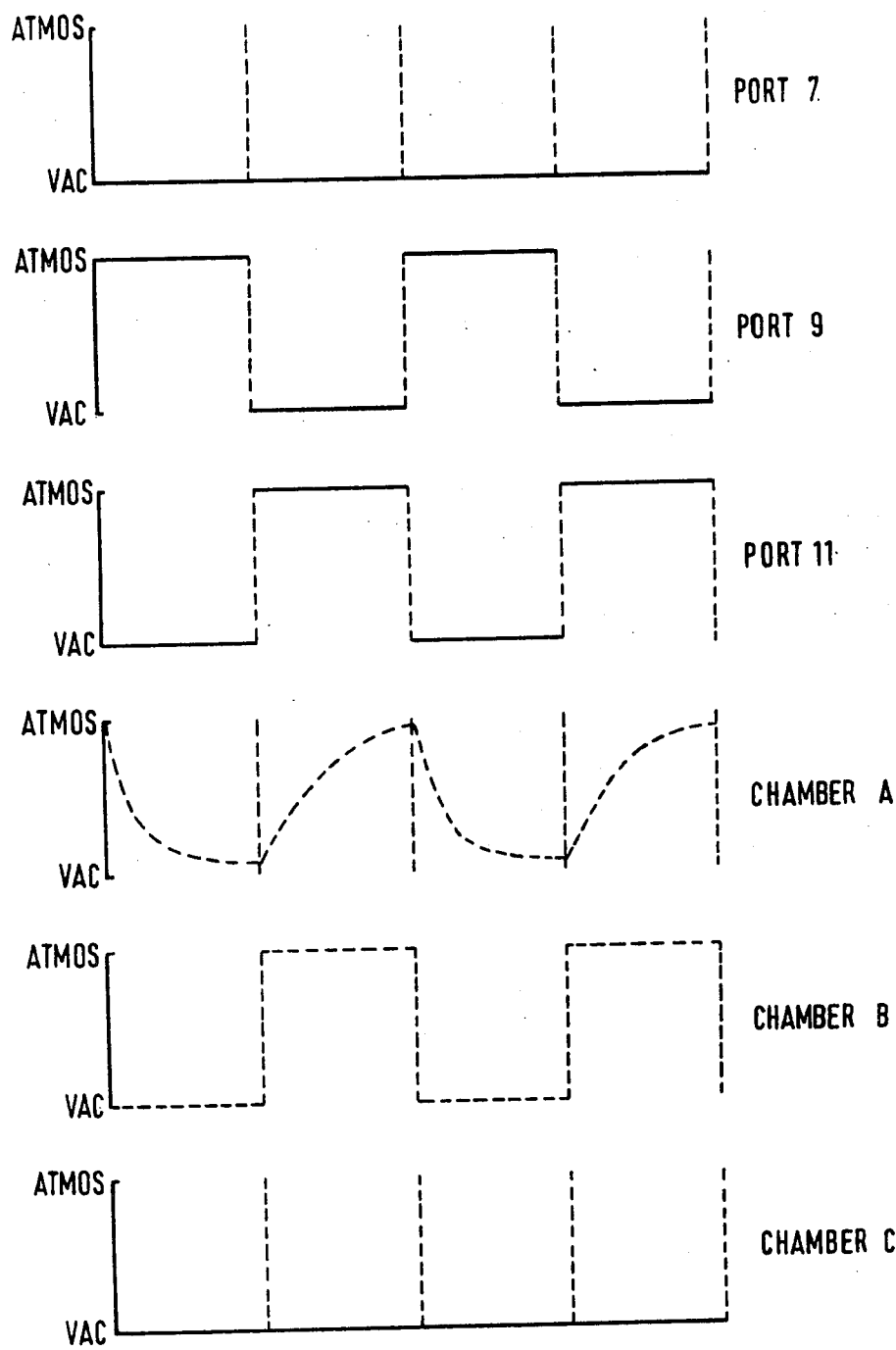
FIG. 3 shows a number of pressure/time diagrams, explaining the pressure levels in various parts of the control valve during operation.

The operation of the vacuum line control valve of FIG. 1 will be understood from the following description and by reference to the view of FIG. 2 and the pressure/time diagrams of FIG. 3.

When vacuum input is first applied to the control valve at port 7, and with the diaphragm 4 and valve-closure member 15 in the position shown in FIG. 1, chamber B is exhausted and the input vacuum is directly applied at output port 11 by way of orifice 24, passageway 23, passageway 28 and orifice 27. Output port 9 is at this time vented at atmosphere by way of open first vent 13.

Chamber A will at this time be at atmospheric pressure, so that diaphragm will be drawn downwardly by the negative pressure in chamber part B.

Immediately, however, the pressure state in chamber A begins to change due to the bleed aperture 26 connecting the chamber A at atmospheric pressure and the passageway 23 at vacuum pressure. The pressure in chamber A, and hence the integrated pressure over the area of the upper face of diaphragm 4, falls progressively.

During this time, the uniform pressure upwardly on the lower face of diaphragm 4 bounded by wall 5 is the vacuum pressure of chamber B. In consequence of the greater area of diaphragm 4 which faces into chamber A, a balance will occur between the opposed forces upon the upper and lower faces of diaphragm 4 before the pressure in chamber A falls to vacuum pressure.

Immediately the pressure in chamber A falls below this critical value, the diaphragm 4 will be displaced laterally upwardly, thereby raising the entire valve-closure structure 15 from the position shown in FIG. 1 to that shown in FIG. 2.

Referring now to FIG. 2, it will be seen that the first vent 13 is closed by movement of flange 18 closing ring seal 19. Movement of flange 20 releases ring seal 21, so opening passageway 13'. The same movement seals ring seal 22, so closing passageway 14.

At the top of the valve-closure structure 15, corresponding movement of flange 33 releases ring seal 34 to open the passageway 32.

In consequence of these valve operations, output port 9 is sealed from atmosphere and is connected to vacuum input port 7. Output port 11 is sealed from the input port 7 and is vented to atmosphere at the second vent 31.

Chamber B is vented to atmosphere by way of orifice 24, passageway 23, passageway 28, and orifice 27, so that the pressure on the underside of diaphragm 4 immediately changes to atmospheric pressure.

The pressure in chamber A at this time will be vacuum pressure, so that the diaphragm 4 and valve structure 15 is positively held in the position of FIG. 2.

Immediately, however, the pressure in chamber A begins to rise by reason of the bleed orifice 26. At this time, chamber B is at atmospheric pressure whereas the chamber C below, which accommodates the valve flange 20 and which is connected to the vacuum input port 7, is at vacuum pressure. A differential pressure exists therefore between the upper and lower faces of the valve flange 20. Vacuum pressure is exerted upon the whole of the lower face and atmospheric pressure is exerted upon the upper face as far as the circle defined by the ring seal 22. A resultant pressure downwards exists, therefore, upon the whole valve closure structure 15. In consequence, before chamber A reaches atmospheric pressure, a resultant of pressures will cause the diaphragm 4 to return to the position shown in FIG. 1. The cycle of operation then repeats.

Instantly the valve-closure member 15 has reseated, the state of the various control valve chambers and output ports reverts to the states first described with reference to FIG. 1. The operation is repetitive so long as vacuum is applied at input port 7. The vacuum being supplied alternately to output port 9 and output port 11 is as shown in the diagrams of FIG. 3.

As will be evident from the foregoing description, the bleed rate causing the pressure in chamber A to fall from atmospheric pressure in the position shown in FIG. 1 and causing the pressure in chamber A to rise towards atmospheric pressure in the position shown in FIG. 2, is determined by the diameter of the bleed orifice 26. The balance of pressures causing the diaphragm 4 to move from the position of FIG. 2 to the position of FIG. 1 is determined by the effective diameter of the valve flange 20 to the ring seal 22 circle.

In the embodiment described above, these variables are so set that the interval duration of vacuum pressure and of atmospheric pressure at output port 9 is equal to each other. Because vacuum pressure at output port 9 corresponds to atmospheric pressure at output port 11 and vice versa, equal vacuum/atmospheric pressure durations at output port 9 also define equal vacuum/atmospheric pressure durations at output port 11.

FIG. 3 shows six pressure/time diagrams showing the corresponding instantaneous pressures of port 7, port 9, port 11, chamber A, chamber part B and chamber C, respectively. The pressure levels corresponding to atmospheric and vacuum pressures are shown in each diagram. The coincident vertical broken lines show the occurrence of successive displacements of the diaphragm 4 and valve-closure structure 15. Two successive complete cycles of operation of the control valve are shown in the diagrams.

From the second and third diagrams of FIG. 3, corresponding to the pair of output ports respectively, it is seen that the input vacuum is supplied to the output ports alternately, the ports being vented to atmosphere when not at vacuum pressure.

We claim:

1. A vacuum line control valve operable from a single vacuum input line, to provide vacuum output alternately in a pair of differential output vacuum lines, comprising a hollow body divided into two chambers by a laterally displaceable elastic diaphragm, a vacuum input port for connection to said vacuum input line, first and second differential output vacuum ports for connection to said pair of output vacuum lines, at least one controllable vent to atmosphere, an internal communicating channel and a valve structure, said valve structure being operable by movement of said diaphragm to connect said vacuum input port alternately to the first output vacuum port, while venting the second output port to atmosphere, and to the second output vacuum port, while venting the first output port to atmosphere, in a continuous manner so long as a vacuum input is applied at said input port, said valve further having first and second controllable vents to atmosphere associated respectively with said first and second output ports, wherein said internal communicating channel is formed internally of said valve structure and wherein said valve structure is operable by movement of said diaphragm for connecting said vacuum input port to the first output vacuum port while venting the second output port to atmosphere at said second controllable vent and for connecting said vacuum input port alternately to the second output vacuum port while venting the first output port to atmosphere at said first controllable vent, said connection of the vacuum input port to one of the said output ports being made by way of the said internal communicating channel.

2. A vacuum line control valve as claimed in claim 1, in which the said internal communicating channel communicates with both of said two chambers, the communication with one of the two chambers being relatively restricted and the communication with the other one of the two chambers being relatively unrestricted.

3. A vacuum line control valve as claimed claim 1, in which the laterally displaceable elastic diaphragm is held and sealed around its circumference in a hollow body and is displaceable only in a central portion.

4. A vacuum line control valve as claimed in claim 3, in which the said hollow body is formed from upper and lower moulded parts which respectively provide the said two chambers.

5. A vacuum line control valve operable from a single vacuum input line to provide vacuum output alternately in a pair of differential output vacuum lines, comprising a hollow body divided into two chambers by an elastic diaphragm laterally displaceable in one direction, a vacuum input port for connection to said vacuum input line, first and second differential output vacuum ports for connection to said pair of output vacuum lines, at least one valve-controllable vent to atmosphere, an internal communicating channel and a valve structure, said valve structure being supported by said diaphragm and being operable by displacement and return of said diaphragm to connect said vacuum input port alternately to the first output vacuum port, while venting the second output port to the atmosphere, and to the second output vacuum port, while venting the first output port to atmosphere, in a continuous manner so long as a vacuum input is applied at said input port, said diaphragm having an initial and return position corresponding to one output port connection and a laterally displaced position corresponding to the other output port connection, in which at least in said initial and return position of said diaphragm, said diaphragm bounds the respective body chambers with unequal face areas.

6. A vacuum line control valve as claimed in claim 5 in which the said hollow body is formed from mating moulded parts dimensioned to retain said diaphragm therebetween and presenting unequal chamber cross-section areas thereto.

7. A vacuum line control valve as claimed in claim 6, in which said input port is connected to a third chamber, said third chamber being connected, in said initial and return position of said diaphragm, to that one of the body chambers having the smaller bounding area of diaphragm, therefrom to said internal communicating channel, therethrough to said one output port and, by way of said internal communicating channel and a bleed orifice, to the other of said two body chambers, and said third chamber being connected, in said laterally displaced position of said diaphragm, to said other output port.

* * * * *